US010920512B2

(12) United States Patent
Liu

(10) Patent No.: US 10,920,512 B2
(45) Date of Patent: Feb. 16, 2021

(54) SUBMERSIBLE PUMP SUPPORT ROD STABILIZING DEVICE

(71) Applicant: Weidong Liu, Qingdao (CN)

(72) Inventor: Weidong Liu, Qingdao (CN)

( * ) Notice: Subject to any disclaimer, the term of this patent is extended or adjusted under 35 U.S.C. 154(b) by 0 days.

(21) Appl. No.: 16/987,388

(22) Filed: Aug. 6, 2020

(65) Prior Publication Data

US 2020/0370566 A1 Nov. 26, 2020

Related U.S. Application Data

(63) Continuation of application No. PCT/CN2018/112096, filed on Oct. 26, 2018.

(51) Int. Cl.
*F04D 13/08* (2006.01)
*E21B 23/01* (2006.01)
(Continued)

(52) U.S. Cl.
CPC .............. *E21B 23/01* (2013.01); *E21B 17/10* (2013.01); *E21B 17/1021* (2013.01); *E21B 19/02* (2013.01); *F04D 13/10* (2013.01); *F04D 29/606* (2013.01); *F04D 13/08* (2013.01); *F05B 2240/97* (2013.01)

(58) Field of Classification Search
CPC .... E21B 43/127; E21B 43/128; E21B 43/129; E21B 23/12; E21B 23/129; E21B 17/1021; E21B 17/1071; E21B 19/02; F04D 13/10; F04D 29/606; F05B 2240/97; F05B 13/08
See application file for complete search history.

(56) References Cited

U.S. PATENT DOCUMENTS 2,670,686 A * 3/1954 Bergh ..................... F04D 13/10
417/422
2,939,400 A * 6/1960 Maynard ................. F04D 13/10
417/423.3

(Continued)

FOREIGN PATENT DOCUMENTS

CN 2097300 U 2/1992
CN 2176453 Y 9/1994

(Continued)

OTHER PUBLICATIONS

Internation Search Report of PCT/CN2018/112096, dated Jan. 30, 2019.

*Primary Examiner* — Yong-Suk (Philip) Ro
(74) *Attorney, Agent, or Firm* — True Shepherd LLC; Andrew C. Cheng

(57) ABSTRACT

A submersible pump support rod stabilizing device includes: a submersible pump, an upper support rod, a lower support rod, etc. The upper part at the one side and the lower part at the other side of the submersible pump have upper support rods and lower support rods respectively, and the upper and lower support rods have bends towards the side of the submersible pump and a small section of the rod head. This small section of the rod head has a circular ring above it, the rod head has an inclined edge and a section of rope. The two ends are respectively fixed on the circular rings of the upper and lower support rod heads at the one side of submersible pump, the rope has wheels, and the other digging rope is hauled upward by the wheel and the other end of the digging rope is fixed at the wellhead.

2 Claims, 3 Drawing Sheets

(51) Int. Cl.

| | |
|---|---|
| ***E21B 17/10*** | (2006.01) |
| ***E21B 19/02*** | (2006.01) |
| ***F04D 13/10*** | (2006.01) |
| ***F04D 29/60*** | (2006.01) |

(56) References Cited

U.S. PATENT DOCUMENTS 2,960,937 A * 11/1960 Wright .................... F04D 13/10
417/423.11
3,238,879 A * 3/1966 Shallenberg ............ F04D 13/10
415/131
3,375,789 A * 4/1968 Easton .................... F04D 13/10
415/199.3
4,664,186 A * 5/1987 Roeder ................... F04B 47/08
166/106
5,494,102 A * 2/1996 Schulte ................. E21B 43/129
166/105.6
9,303,496 B2 4/2016 Xiao et al.
9,409,183 B2 8/2016 Kean et al.
9,617,832 B2 * 4/2017 Butler ..................... E21B 23/12
2008/0060891 A1 * 3/2008 Chen ..................... F16D 65/122
188/218 XL
2012/0082571 A1 * 4/2012 Filippi .................. E21B 43/128
417/279
2015/0071794 A1 * 3/2015 Zupanick .............. F04B 47/028
417/362

FOREIGN PATENT DOCUMENTS

CN 2180810 Y 10/1994
CN 101694220 A 4/2010
CN 204140503 U 2/2015
CN 205446087 U 8/2016
CN 108506242 A 9/2018
GB 2218137 A 11/1989

* cited by examiner

SUBMERSIBLE PUMP SUPPORT ROD STABILIZING DEVICE

CROSS-REFERENCE TO RELATED APPLICATIONS

This application is a continuation of International Patent Application No. PCT/CN2018/112096 with a filing date of Oct. 26, 2015, designating the United States, now pending, and further claims priority to Chinese Patent Application No. 201810354807.3 with a filing date of Apr. 19, 2018. The content of the aforementioned applications, including any intervening amendments thereto, are incorporated herein by reference.

TECHNICAL FIELD

The present invention belongs to the technical field of pumps.

BACKGROUND OF THE PRESENT INVENTION

When a submersible pump starts and shuts down, due to the tremendous changes in both the axial and radial forces of the pump, the pump will generate a greater oscillation and axial movement, hitting the wait of the well, resulting excessive wearing digging ropes, cables and outlet pipes. Existing technologies, such as the utility model patent with the patent number 91209460.5 issued by the State Intellectual Property Office of China, are used to drive four upper and lower passive rod heads with the upper and lower passive rods of the submersible pump hinge linked through the runner, traction rope, push block, active rod, and connecting rod, so that the supporting block on the other end of the upper and lower passive rods is pressed against the well wall, so as to stabilize the submersible pump. When the submersible pump is to be loosened, the traction rope is loosened by rotating the runner, and the push block is moved down by the spring action. The active rod and the upper and lower passive rods are loosened, the support blocks pressed against the well wall by the upper and lower passive rod heads are separated from the well wall, and the submersible pump is loosened.

SUMMARY OF PRESENT INVENTION

From the disclosure of the CN Pat No. 91209460.5, it can be readily appreciated that the operating process is complicated, and the production cost is high. Since the well wall is not completely straight, the support pressure of the upper and lower support blocks on the well wall is inconsistent, which will cause the submersible pump to be unstable, and the contact surface of the upper and lower support blocks with the well wall is flat, so that the contact between the upper and lower support blocks and the well wall is unstable and it is easy to slide.

The technical solution of the present invention is: an upper portion of one side and on a lower portion of the other side of the submersible pump are respectively provided with screw rods fixed to a pump body and the upper support rod and the lower support rod are rotationally connected to the screw rods through middle holes thereof; a profiled gasket conforming to the shape of a pump casing is provided on a portion of each screw on the inner side of the middle hole of each of the upper and lower support rods, and an ordinary gasket is provided on a portion of the screw on the outer side of the middle hole; a screw cap is provided on the outer side of the ordinary gasket, and the screw cap is tightened and then loosened slightly so that each of the upper and lower support rods is capable of rotating up and down with the respective screw rod as a center. At portions close to their two ends, the upper and lower support rods are respectively provided with bends which bend towards the side of the submersible pump, with center lines of the upper and lower support rods as references, till meeting planes which are parallel to straight middle portions of the upper and lower support rods and which pass through a center line of the submersible pump, and then bend outwards along the planes to form a small segment of rod end respectively, which has the respective circular ring welded and fixed thereon; at end portions, all the rod ends are provided with respective inclined edges in the vertical direction, wherein all the upper and lower support rod ends on one side of the submersible pump are lower, and the inclined edges thereon are inclined in an obliquely upward direction relative to the upper and lower support rod ends, while all the upper and lower support rod ends on the other side are higher, and the inclined edges thereon are inclined in an obliquely downward direction relative to the upper and lower support rod ends; two ends of the rope are respectively fixed to the circular rings on the rod ends of the upper and lower support rods on the side of the submersible pump where all the rod ends are lower; the rope is provided with the pulley and is arranged in a pulley rim on a pulley spindle; an end of one pull cord passes through a center hole of the pulley spindle and is self-tied upwards and fixed thereby, so that when the pull cord is pulled upwards via the pulley, and the other end of the pull cord is fixed at the mouth of a well, the inclined edges on the rod ends of the upper and lower support rods respectively push against a well wall, thus stabilizing the submersible pump; one end of the other pull cord is fixed to the circular ring on the rod end of the lower support rod on the other side of the submersible pump where all the inclined edges of the rod ends are higher, and the pull cord is again knotted and fixed on the ring on the end of the upper support rod, at a position slightly further than the distance from the circular ring on the rod end of the lower support rod to the circular ring on the rod end of the upper support rod, on the side of the submersible pump, so that when the pull cord is pulled upwards, the inclined edges on the rod ends of the upper and lower support rods are respectively disengaged from the well wall to release the submersible pump, and the pull rope is further pulled so that the submersible pump is lifted out of the well.

The two upper and lower support rod heads are provided with inclined edges, and the middle part is rotatably connected to the pump body. The invention directly suspends the upper and lower support rod heads through a pull rope to stabilize the submersible. To loosen, it is possible to directly pull up the digging rope at the other head of the upper and lower support rods. The oblique edges of the upper and lower support rod heads detach from the well wall, and the submersible pump is loosened. Continuing to pull lifts the submersible pump out of the well. This kind of submersible pump stabilization device has a unique structure, simple operation, with good stability of the submersible pump, and great practical value, because the upper and lower support rod heads have inclined edges and are pressed against the well wall respectively. Therefore, even if the well wall is uneven, the device can be firmly pressed against the well wall without easily sliding.

DETAILED DESCRIPTION OF PREFERRED EMBODIMENTS

Figure 1:
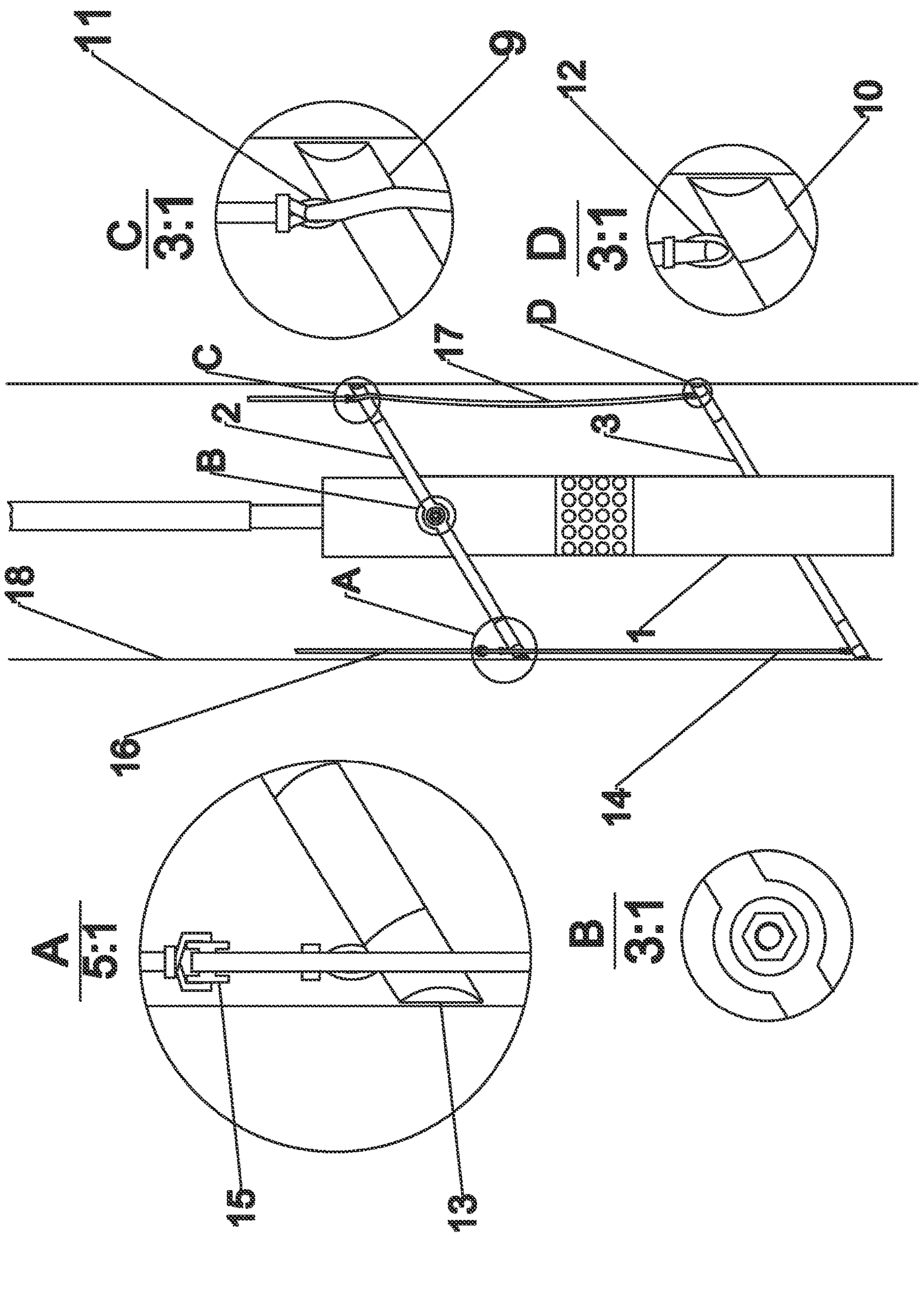
FIG. 1 is a front view of the present invention with several partially enlarged views showing the details.
Figure 2:
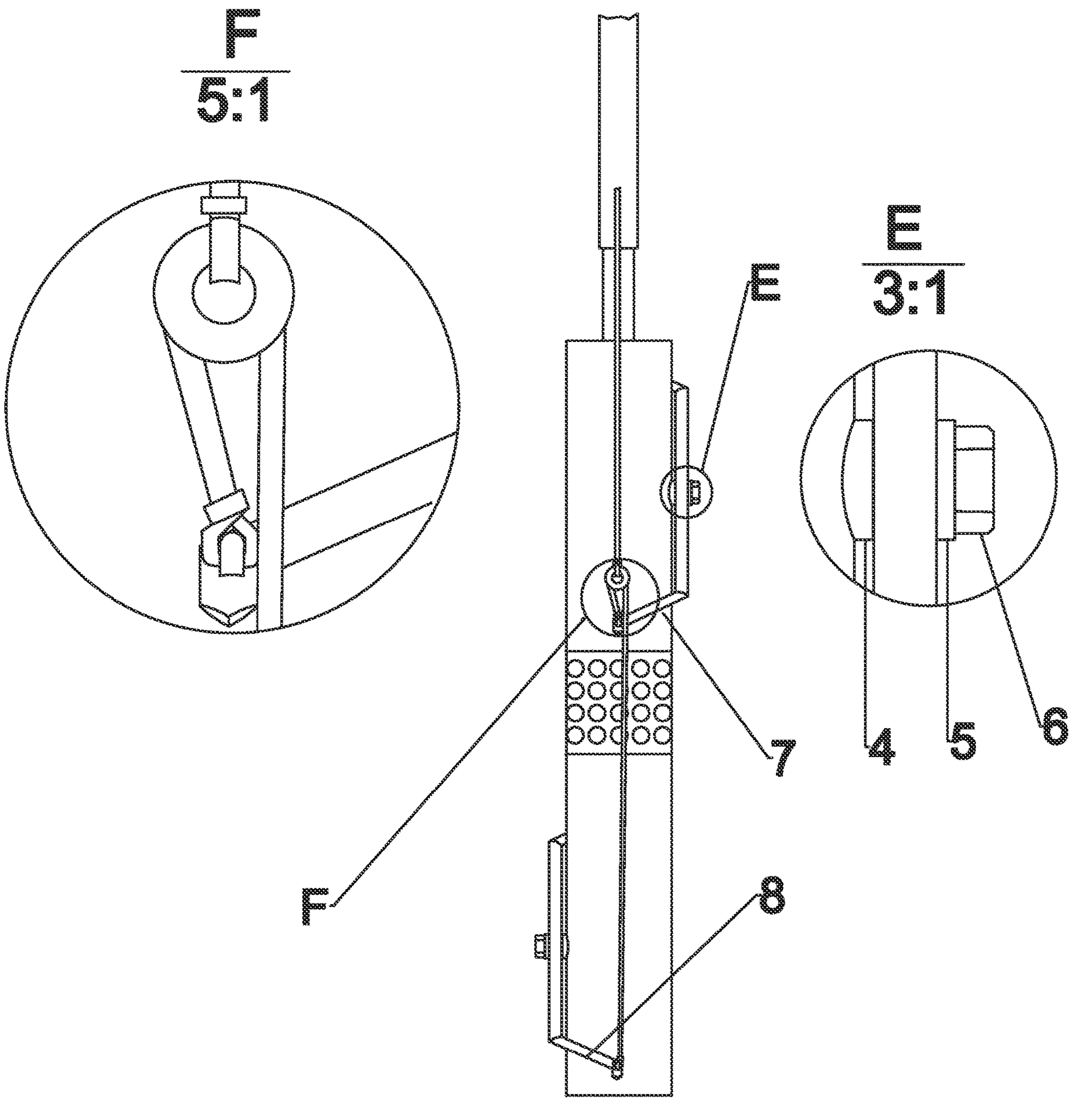
FIG. 2 is a side view of the present invention with several partially enlarged views showing the details.
Figure 3:
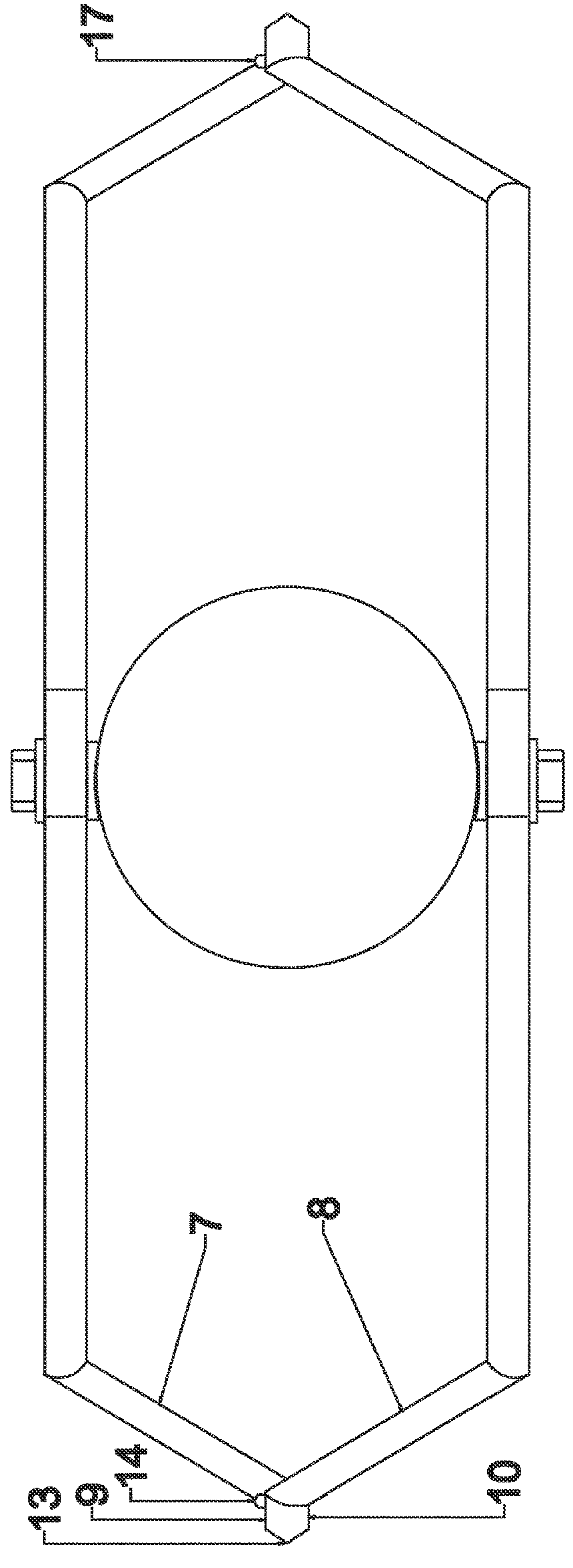
FIG. 3 is a bottom view of the present invention.

As shown in FIG. 1 to FIG. 3, a submersible pump support rod stabilizing device includes a submersible pump 1, an upper support rod 2, a lower support rod 3, profiled gaskets 4, ordinary gaskets 5, screw caps 6, upper support rod bends 7, lower support rod bends 8, upper support rod ends 9, lower support rod ends 10, upper support rod end circular rings 11, lower support rod end circular rings 12, inclined edges 13, a rope 14, a pulley 15, a pull cord 16, a pull cord 17, and a well wall 18. On an upper portion of one side and on a lower portion of the other side of the submersible pump 1 are respectively provided screw rods fixed to a pump body, and the upper support rod 2 and the lower support rod 3 rotationally connected to the screw rods through middle holes thereof. At the inner side of the middle hole of each of the upper support rod 2 and the lower support rod 3, the screw rod is sleeved with the respective profiled gasket 4, a side of the profiled gasket facing inwards conforming to the shape of a housing of the pump 1. At the outer side of the middle hole, the screw rod is sleeved with the respective ordinary gasket 5. The screw cap 6 is arranged at the outer side of the ordinary gasket 5. The respective screw caps 6 are tightened and then slightly loosened, such that the upper support rod 2 and the lower support rod 3 are capable of swinging up and down with the positioning screw rods as centers thereof, while being positioned. At portions close to their two ends, the upper support rod 2 and the lower support rod 3 are respectively provided with bends 7, 8 which bend towards the side of the submersible pump 1, with center lines of the upper support rod 2 and the lower support rod 3 as references, till meeting planes which are parallel to straight middle portions of the upper support rod 2 and the lower support rod 3 and which pass through a center line of the submersible pump 1, and then bend outwards along the planes to form a small segment of rod ends 9, 10 respectively. The small segment of rod ends 9, 10 has the respective circular ring 11, 12 welded and fixed thereon. At end portions, all the rod ends 9, 10 are provided with the respective inclined edges 13 in the vertical direction, wherein all the upper and lower support rod ends 9, 10 on one side of the submersible pump 1 are lower, and all the inclined edges 13 thereon are inclined in an obliquely upward direction relative to the upper and lower support rod ends 9, 10, while all the upper and lower support rod ends 9, 10 on the other side are higher, and all the inclined edges 13 thereon are inclined in an obliquely downward direction relative to the upper and lower support rod ends 9, 10. A rope 14, two ends of the rope 14 are respectively fixed to the circular rings 11, 12 on the rod ends 9, 10 of the upper support rod and the lower support rod on the side of the submersible pump 1 where all the rod ends are lower. The rope 14 is provided with the pulley 15, and the rope 14 is arranged in a pulley rim on a pulley spindle. An end of the pull cord 16 passes through a center hole of the pulley spindle and is self-tied upwards and fixed thereby, so that when the pull cord 16 is pulled upwards via the pulley 15, and the other end of the pull cord 16 is fixed at the mouth of a well, the inclined edges 13 on the rod ends of the upper support nod and the lower support rod respectively push against the well wall 18, thus stabilizing the submersible pump 1. One end of the pull cord 17 is fixed to the circular ring 12 on the rod end 10 of the lower support rod on the side of the submersible pump 1 where all the upper and lower support rod ends 9, 10 are higher, and the pull cord 17 is again knotted and fixed on the ring 11 on the end of the upper support rod, at a position 8 cm further than the distance from the circular ring 12 on the rod end of the lower support rod to the circular ring 11 on the rod end of the upper support rod, on the side of the submersible pump 1, so that when the pull cord 17 is pulled upwards, the inclined edges 13 on the rod ends of the upper support rod and the lower support rod are respectively disengaged from the well wall 18 to release the submersible pump 1, and when the pull cord is further pulled, the submersible pump 1 is lifted out of the well.

This kind of submersible pump stabilization device has a unique structure, simple operation, with good stability of the submersible pump, and great practical value. Because the upper and lower support rod heads have inclined edges and are pressed against the well wall respectively, even if the well wall is uneven, the device can be firmly pressed against the well wall without easily sliding.

I claim:

1. A submersible pump support rod stabilizing device, comprising: a submersible pump, an upper support rod, a lower support rod, profiled gaskets, ordinary gaskets, screw caps, upper support rod bends, lower support rod bends, upper support rod ends, lower support rod ends, upper support rod end circular rings, lower support rod end circular rings, inclined edges, a rope, a pulley and pull cords, wherein on an upper portion of one side and on a lower portion of the other side of the submersible pump are respectively provided screw rods fixed to a pump body and the upper support rod and the lower support rod rotationally connected to the screw rods through middle holes thereof; at portions close to their two ends, the upper and lower support rods are respectively provided with bends which bend towards the side of the submersible pump, with center lines of the upper and lower support rods as references, till meeting planes which are parallel to straight middle portions of the upper and lower support rods and which pass through a center line of the submersible pump, and then bend outwards along the planes to form a small segment of rod end respectively, which segment has a circular ring welded and fixed thereon; at end portions, all the rod ends are provided with respective inclined edges in the vertical direction, wherein all the upper and lower support rod ends on one side of the submersible pump are lower, and the inclined edges thereon are inclined in an obliquely upward direction relative to the upper and lower support rod ends, while all the upper and lower support rod ends on the other side are higher, and the inclined edges thereon are inclined in an obliquely downward direction relative to the upper and lower support rod ends; two ends of the rope are respectively fixed to the circular rings on the rod ends of the upper and lower support rods on a side of the submersible pump where all the rod ends are lower; the rope is provided with the pulley and is arranged in a pulley rim on a pulley spindle; an end of one pull cord passes through a center hole of the pulley spindle and is self-tied upwards and fixed thereby, so that when the pull cord is pulled upwards via the pulley, and the other end of the pull cord is fixed at the mouth of a well, the inclined edges on the rod ends of the upper and lower support rods respectively push against a well wall, thus stabilizing the submersible pump; one end of the other pull cord is fixed to the circular ring on the rod end of the lower support rod on the other side of the submersible pump where all the inclined edges of the rod ends are higher, and the pull cord is again knotted and fixed on the ring on the end of the upper support rod, at a position slightly further than the distance from the circular ring on the rod end of the lower support rod to the circular ring on the rod end of the upper support rod, on the side of the submersible pump, so that when the pull cord is pulled upwards, the inclined edges on the rod ends of the upper and lower support rods are respectively disengaged from the well wall to release the submersible pump, and the pull rope is further pulled so that the submersible pump is lifted out of the well.

2. The submersible pump support rod stabilizing device, according to claim 1, wherein the profiled gasket conforming to a shape of a pump casing is provided on a portion of each screw on an inner side of the middle hole of each of the upper and lower support rods, and the ordinary gasket is provided on a portion of the screw on an outer side of the middle hole; and the screw cap is provided on the outer side of the ordinary gasket, and the screw cap is tightened and then loosened slightly so that each of the upper and lower support rods is capable of rotating up and down with the respective screw rod as a center.

* * * * *